US009162245B1

(12) United States Patent
Martin

(10) Patent No.: US 9,162,245 B1
(45) Date of Patent: Oct. 20, 2015

(54) POWDER COATING CONVEYOR SUPPORT

(75) Inventor: Craig A. Martin, Brainerd, MN (US)

(73) Assignee: BTD Wood Powder Coating, Inc., Brainerd, MN (US)

(*) Notice: Subject to any disclaimer, the term of this patent is extended or adjusted under 35 U.S.C. 154(b) by 320 days.

(21) Appl. No.: 13/434,039

(22) Filed: Mar. 29, 2012

(51) Int. Cl.
*B23Q 1/00* (2006.01)
*B05B 15/12* (2006.01)
*B05B 5/08* (2006.01)

(52) U.S. Cl.
CPC ............. *B05B 15/1292* (2013.01); *B05B 5/087* (2013.01)

(58) Field of Classification Search
USPC .......................................................... 269/46
See application file for complete search history.

(56) References Cited

U.S. PATENT DOCUMENTS

| | | | | |
|---|---|---|---|---|
| 2,808,343 | A * | 10/1957 | Simmons | 427/477 |
| 3,099,394 | A * | 7/1963 | Lynn | 239/142 |
| 3,228,613 | A * | 1/1966 | Goldstein | 239/318 |
| 3,402,741 | A * | 9/1968 | Yurdin | 138/118 |
| 3,496,413 | A | 2/1970 | Goodridge et al. | |
| 3,695,909 | A * | 10/1972 | Fabre et al. | 27/459 |
| 3,696,786 | A * | 10/1972 | Garwood | 119/69.5 |
| 3,850,660 | A | 11/1974 | Inamura et al. | |
| 3,854,439 | A * | 12/1974 | Harmuth | 118/679 |
| 3,871,326 | A | 3/1975 | Kanda et al. | |
| 3,901,185 | A | 8/1975 | Goodridge et al. | |
| 4,053,661 | A | 10/1977 | Goodridge | |
| 4,098,226 | A | 7/1978 | Furter | |
| 4,101,687 | A | 7/1978 | Knudsen | |
| 4,273,798 | A * | 6/1981 | Scheiber | 427/476 |
| 4,538,897 | A | 9/1985 | Osaka et al. | |
| 4,729,513 | A | 3/1988 | Fetcenko et al. | |
| 4,958,587 | A | 9/1990 | Fogal, Sr. et al. | |
| 5,116,181 | A * | 5/1992 | Severns et al. | 414/222.03 |
| 5,176,869 | A | 1/1993 | Okamoto et al. | |
| 5,179,910 | A * | 1/1993 | Habsburg-Lothringen | 118/634 |
| D333,310 | S * | 2/1993 | Off et al. | D15/78 |
| 5,212,847 | A | 5/1993 | Melcher et al. | |
| 5,242,718 | A | 9/1993 | Gillette et al. | |
| D344,217 | S * | 2/1994 | Weiss | D8/2 |
| 5,307,959 | A * | 5/1994 | Bedore et al. | 222/174 |
| 5,316,801 | A * | 5/1994 | Hopeck | 427/486 |
| 5,374,159 | A * | 12/1994 | Severns et al. | 414/806 |
| 5,476,359 | A * | 12/1995 | Severns et al. | 414/806 |
| 5,678,278 | A * | 10/1997 | McBride et al. | 15/228 |

(Continued)

FOREIGN PATENT DOCUMENTS

| | | | | |
|---|---|---|---|---|
| DE | 19928614 C1 * | 2/2001 | | B05B 1/28 |
| DE | 10219802 A1 * | 12/2002 | | B05D 1/06 |

(Continued)

*Primary Examiner* — Lee D Wilson
*Assistant Examiner* — Alvin Grant
(74) *Attorney, Agent, or Firm* — Patterson Thuente Pedersen, P.A.

(57) ABSTRACT

A powder coating system including a powder coating conveyor, a work piece; the powder coating conveyor including a hang hole tool having a conveyor portion and a work piece engaging portion. The work piece engaging portion is structured to engage a conveyor member supported by the conveyor structure. The work piece engaging portion has an outwardly extending shaft portion extending distally outward from an expanded portion. The work piece has a recess therein, the recess being shaped and sized to receive the work piece engaging portion in close fitting relation and the recess having a first inside dimension at a greatest depth of the recess and a second inside dimension at a least depth of the recess. The second inside dimension is greater than the first inside dimension.

11 Claims, 7 Drawing Sheets

(56) References Cited

U.S. PATENT DOCUMENTS 5,698,269 A * 12/1997 Carlblom et al. ............. 427/475
D388,710 S * 1/1998 Grunig ............................ D9/543
D399,220 S * 10/1998 Schmidt ........................ D15/140
5,830,274 A * 11/1998 Jones et al. .................... 118/620
5,875,539 A * 3/1999 Kilpatrick et al. .............. 29/596
6,003,786 A * 12/1999 Schwary ........................ 239/310
6,068,702 A 5/2000 Bertellotti et al.
6,397,840 B1 * 6/2002 Chrai et al. .............. 128/202.25
6,558,752 B2 * 5/2003 Bellemare et al. ............ 427/459
6,655,607 B2 * 12/2003 Vazquez ........................ 239/288
6,827,780 B2 12/2004 Bertellotti et al.
6,905,778 B2 6/2005 Tullos et al.
6,914,103 B2 7/2005 Tullos et al.
6,921,558 B2 7/2005 Fredericksen et al.
7,018,680 B2 3/2006 Käsmä et al.
7,041,340 B2 5/2006 Kittle et al.
7,166,941 B2 * 1/2007 Wang .............................. 310/54
7,202,579 B2 * 4/2007 Kim et al. ........................ 310/59
7,220,459 B2 * 5/2007 Trevisan ........................ 427/466
7,417,341 B2 * 8/2008 Mall et al. ........................ 310/59
7,601,401 B2 10/2009 Hennessey
7,618,677 B2 11/2009 Roelofs et al.
7,649,034 B2 1/2010 Ladatto et al.
7,745,002 B2 6/2010 Choi et al.
7,748,347 B2 * 7/2010 Richmond ...................... 119/72
7,802,687 B2 9/2010 Fritz et al.
7,837,967 B2 11/2010 Aoki et al.
7,971,551 B2 7/2011 Mauchle et al.
7,972,660 B2 7/2011 Ring et al.
7,985,524 B2 7/2011 Sacripante et al.
7,997,963 B2 8/2011 Ainsworth et al.
8,088,855 B2 * 1/2012 Hwang et al. ................. 524/405
8,261,695 B2 * 9/2012 Huber .......................... 119/69.5
2003/0024608 A1 * 2/2003 Cooper ......................... 148/321
2005/0056227 A1 * 3/2005 Flowers et al. .............. 119/69.5
2005/0227009 A1 * 10/2005 Wang et al. ................ 427/372.2
2005/0247762 A1 * 11/2005 Breznak et al. ............... 228/245
2006/0021212 A1 * 2/2006 Wang et al. ...................... 29/596
2006/0233960 A1 * 10/2006 Warren et al. .............. 427/421.1
2006/0266447 A1 * 11/2006 Cooper ......................... 148/543
2007/0028846 A1 * 2/2007 Cohen .......................... 119/69.5
2008/0173245 A1 * 7/2008 Reusche et al. .............. 119/69.5
2009/0220704 A1 * 9/2009 Eustace ......................... 427/475

FOREIGN PATENT DOCUMENTS

DE 10318790 A1 * 11/2004 .............. B60R 13/00
DE 202004001354 U1 * 7/2005
DE 102007015703 A1 * 11/2007
DE 102007041065 A1 * 3/2009 ................ E01F 9/04
JP 10219802 A * 8/1998 ................ E03F 1/00
WO WO 9828086 A1 * 7/1998 ................ B05B 1/26

* cited by examiner

POWDER COATING CONVEYOR SUPPORT

FIELD OF THE INVENTION

The invention generally relates to the process of powder coating. More particularly, the invention relates to the powder coating of items that are suspended on a conveyor during the powder coating process. Even more particularly, the invention relates to the powder coating of structures made of non metal materials.

BACKGROUND OF THE INVENTION

Powder coating is a process of coating a surface in which a powdered material is applied to the surface using an electrostatic method, a compressed air method or a fluidized bed.

Powder coating offers environmental and performance benefits over other coating and laminating systems, such as painting. Most commonly, powder coating has been used to apply coatings to metals. More recently, technology and powder materials have been commercialized for powder coating, heat sensitive substrates, such as wood, plastic, composite wood products and materials such as medium density fiber board (MDF).

Generally, powder coating involves the application of charged powder particles to a grounded preheated substrate. The coated substrate is then heated along with the powder coating to melt the powder and fuse it to itself and to the surface being coated. Thermal set coating powders are heated to the powder's melting temperature until the coating particles fuse into a continuous coating layer. Ultraviolet coating powders are heated in an oven and then cured by application of ultraviolet light to the molted powder coating.

Curing of the powder coating materials is accomplished by infrared and/or convention heating for thermal setting powder coatings. In the case of ultraviolet powder coating, the powder coat is heated in a melt flow oven by infrared or convection heating and then exposed to ultraviolet radiation to cure the powder coat. Generally, only a few seconds of ultraviolet application is sufficient to cure the coating.

After curing, powder coated parts are cooled in the open air or may be cured in a forced air flow.

Powder coating has many advantages. Powder coating processes have high transfer efficiency and generally create reduced or no emissions as compared to painting and other coating processes. Powder coating can generally be accomplished in a one step and one coat process. Powder coating generally eliminates edge banding and allows for a significant reduction of exhaust and oven ventilation. Powder coating benefits from minimal drying time, allows reduction in labor due to increase automation and is highly durable and resistant to chemicals.

In powder coating of objects made of wood, MDF or other wood related non-metal products, items to be powder coated are generally transported on an overhead conveyor through the powder coating process. Generally, the parts are hung on a conveyor support for powder coating by hang hook. Unfortunately, when powder coated non-metal parts are removed from the hanging hook on the conveyor, the powder finished may come off of the part when it is detached from the support hook in the location of the supporting hook. This can present an unsightly result as fused powder can be chipped off and creates a large area of powder break-off, which is unsightly and undesirable as it also leaves part of the powder coated object uncoated.

Accordingly, there is still room for improvement in this area.

SUMMARY OF THE INVENTION

The present invention solves many of the above discussed problems by providing a powder coating system including a powder coating conveyor and a work piece in which the powder coating conveyor includes a hang hole tool that has a conveyor portion and work piece engaging portion. The powder coating conveyor is generally an overhead conveyor that suspends work pieces to be powder coated and transports them through the powder coating process.

The work piece engaging portion is structured to engage a conveyor member that is supported by the conveyor structure. The work piece engaging portion according to one example embodiment presents an outwardly extending shaft portion, a collar portion and a frustoconical portion. According to one example embodiment, the outwardly extending shaft portion is distal to the collar portion and the collar portion is distal to the frustoconical portion.

According to an embodiment of the invention, the work piece presents a recess therein and the recess has a first inside diameter at a greater depth of the recess that is less than a second inside diameter at a lesser depth of the recess. Accordingly, when the work piece is coupled to the hang hole tool, the aperture walls of the recess of the work piece contact the work engaging portion such that the outwardly extending shaft portion is received into the portion of the recess having a first inside diameter at a greater depth and the collar portion of the work piece engaging portion is received into the recess within the second inside diameter portion at a lesser depth of the recess. The juncture between the work piece back surface and the recess abuts the frustoconical portion of the work piece engaging portion such that contact between the work piece back surface and the hang hole tool is minimized. Thus, according to this example embodiment of the invention, when the powder coated work piece, having been through the powder coating process, is removed from the hang hole tool, there is minimal contact between the hang hole tool and the back surface of the work piece, thus, a minimal amount of powder coating separates from the work piece when the work piece is detached from the hang hole tool. This minimizes the unsightly portion of the work piece which may show a disruption of the continuous powder coated surface.

According to another aspect of the invention, the invention includes a conveyor support that supports parts during the powder coating process. The conveyor structure includes a hang hole tool having a conveyor engaging portion and a work piece engaging portion. A conveyor engaging portion is structured to engage a conveyor member supported by the conveyor structure. The work piece engaging portion presents an outwardly extending shaft portion having a first diameter and an expanded portion having a second diameter. The first diameter of the outwardly extending shaft portion extends distally outward from the expanded portion.

The expanded portion of the work piece engaging portion includes a collar portion and the outwardly extending shaft portion extends distally outward from the collar portion.

According to another embodiment of the invention, the expanded portion of the work piece engaging portion includes a collar portion and a frustoconical portion. The outwardly extending shaft portion extends distally outward from the collar portion and the collar portion extends distally outward from the frustoconical portion.

In another embodiment of the invention, the expanded portion of the work piece engaging portion includes a frustoconical portion and the outwardly extending shaft portion extends distally outward from the frustoconical portion.

According to another embodiment of the invention, the work piece recess includes a first cylindrical cavity portion that is dimensioned to receive the outwardly extending shaft portion of the hang hole tool and close fitting relation.

According to another embodiment of the invention, the work piece recess presents a second cylindrical cavity portion dimensioned to receive the collar portion closely therein.

According to another embodiment of the invention, the work piece recess presents a counter sunk cavity portion dimensioned to receive the frustoconical portion of the hang hole tool in close fitting relation.

DETAILED DESCRIPTION

Figure 1:
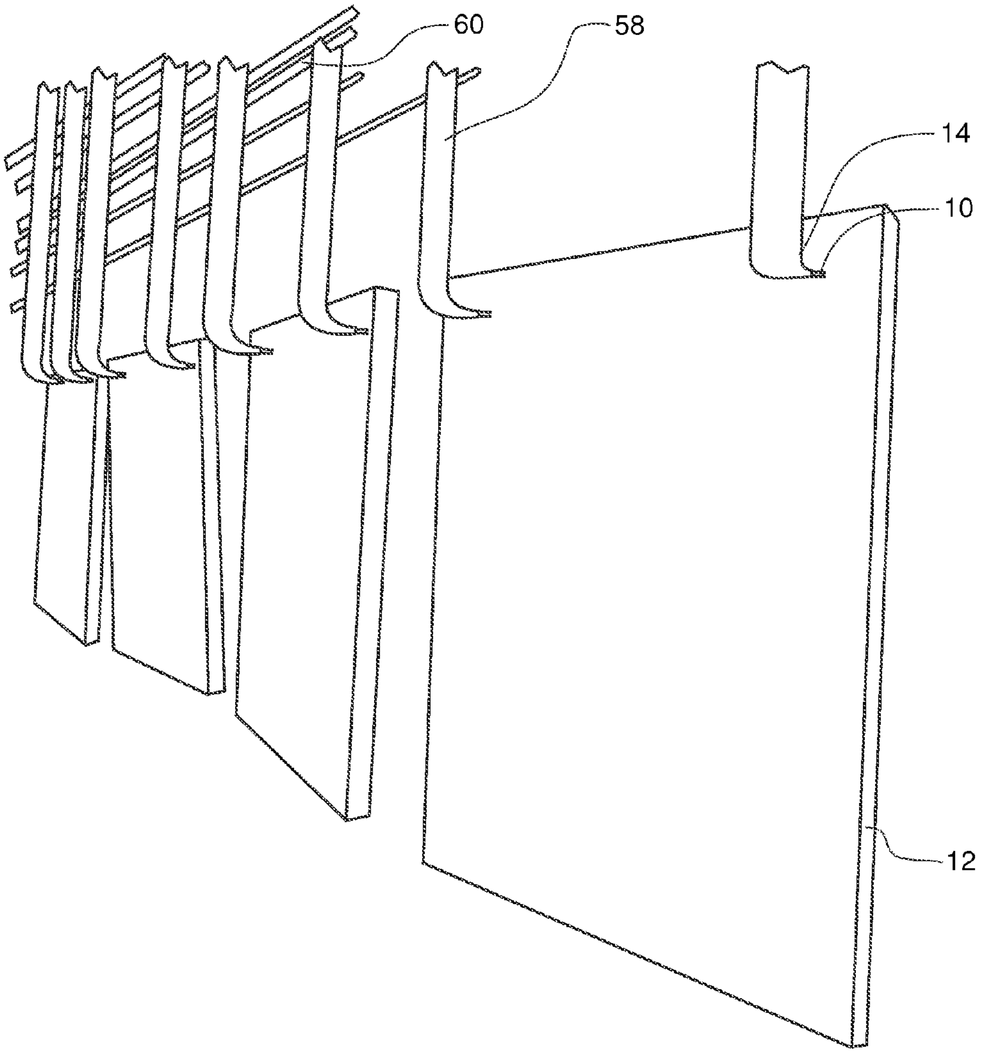
FIG. 1 is a perspective view of a conveyor supporting work pieces to be powder coated.
Figure 3:
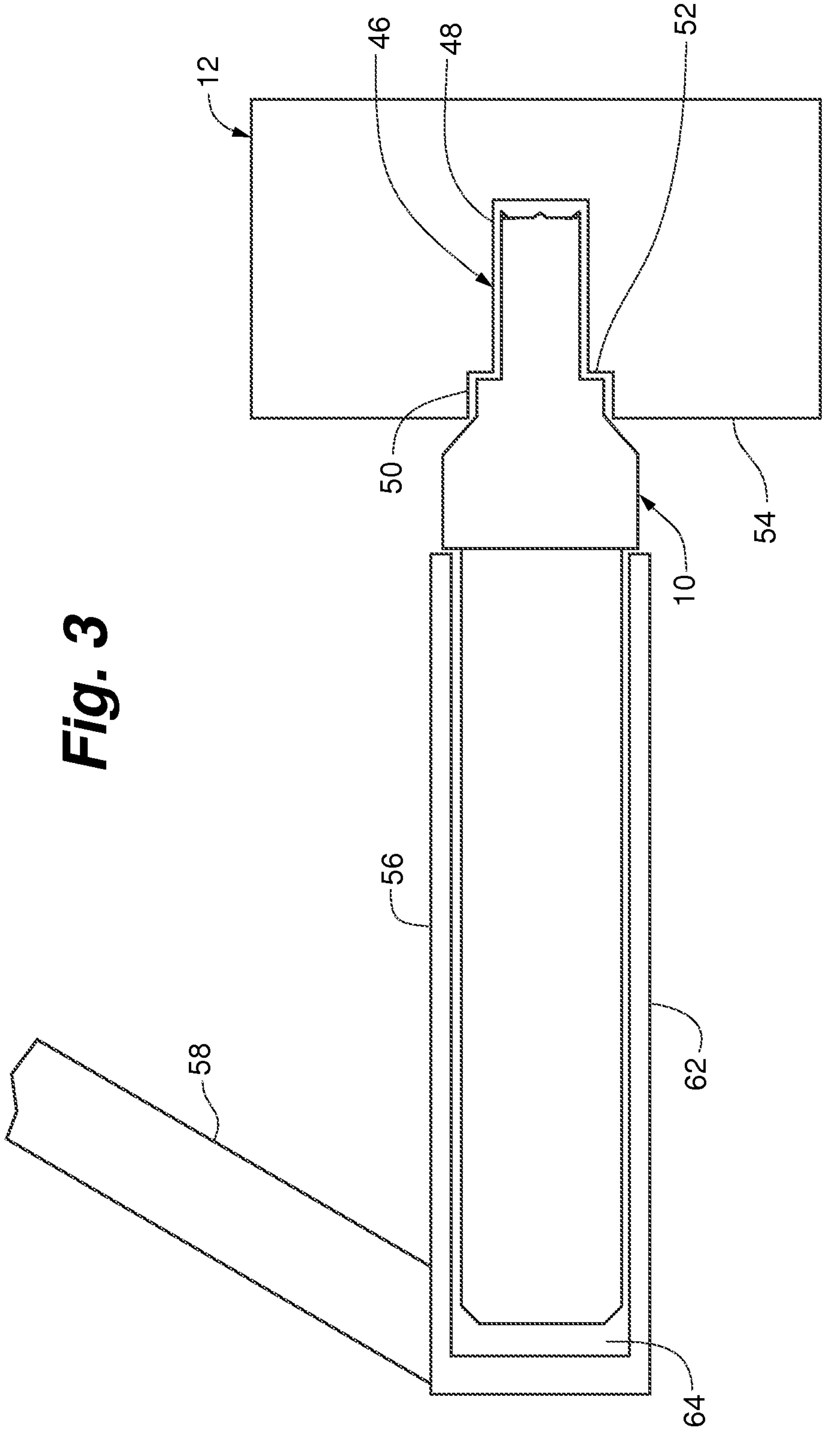
FIG. 3 is a sectional elevational view of a hang hole tool engaged to a work piece and a conveyor member according to an example embodiment of the invention.

Referring particularly to FIGS. 1 and 3, hang hole tool 10 according to the present invention is utilized to support work piece 12 and interfaces with conveyor member 14.

Figure 2:
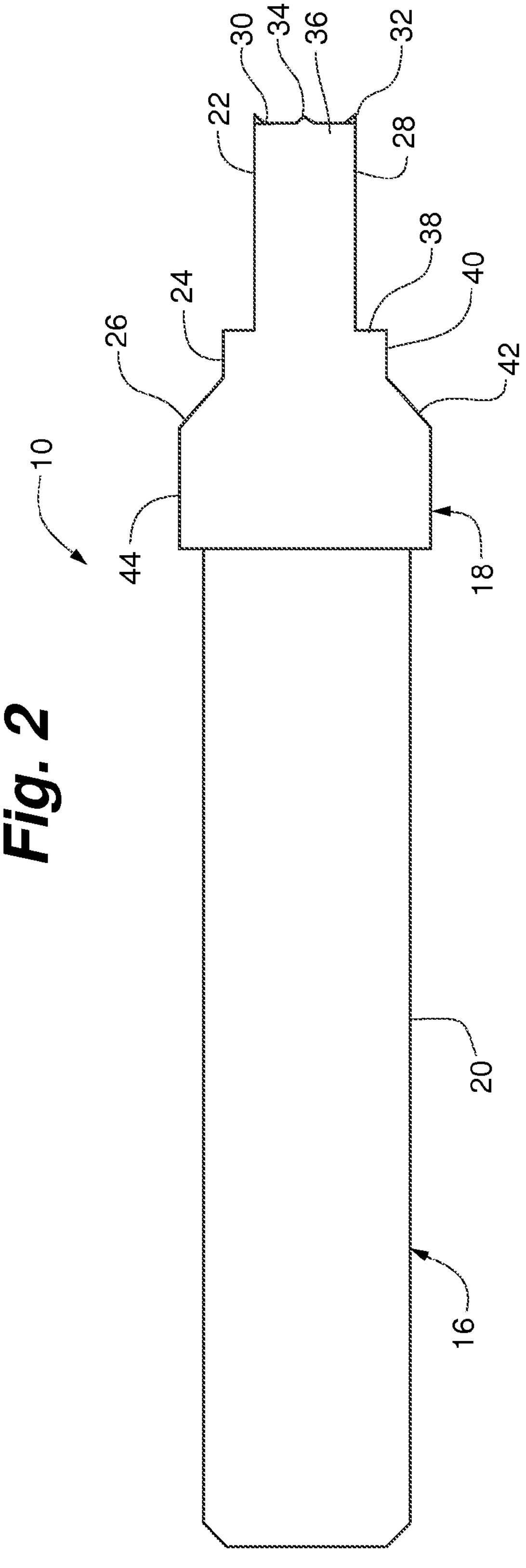
FIG. 2 is a sectional view of a hang hole tool according to an example embodiment of the invention.

Referring particularly to FIG. 2, hang hole tool 10 generally includes conveyor engaging portion 16 and work piece engaging portion 18. In the depicted embodiment, conveyor engaging portion 16 generally includes cylindrical body 20. Cylindrical body 20 may be formed of a ridged material, such as metal, a polymer or any other ridged material.

Work piece engaging portion 18 in the depicted embodiment, generally includes shaft portion 22, collar portion 24 and frustoconical portion 26. Shaft portion 22 generally includes cylindrical shaft body 28 having a generally circular end 30. Circular end 30 presents annular rim 32, central cone 34 and annular flat 36.

Collar portion 24 is located adjacent to shaft portion 22 and may be formed integrally therewith. Collar portion 24 is larger in diameter than shaft portion 22 and presents annular face 38 and cylindrical collar body 40.

Frustoconical portion 26 is adjacent to collar portion 24 and presents frustoconical face 42 and large cylindrical body 44.

Shaft portion 22, collar portion 24 and frustoconical portion 26 may all be formed as an integral unit, for example, by lathe turning or molding procedures. Conveyor engaging portion 16 and work piece engaging portion 18 may also be integrally formed or may be formed of separate components and assembled according to known methods.

Work piece 12, in this example embodiment, is formed of for example, wood, MDF or other material to be powder coated. Work piece 12 presents recess 46 therein. Recess 46 presents first inside diameter wall 48 and second inside diameter wall 50. First inside diameter wall 48 is located at a greater depth within work piece 12 then second inside diameter wall 50. First inside diameter wall 48 defines a smaller inside diameter wall than does second inside diameter wall 50. First inside diameter wall 48 is sized to receive shaft portion 22 therein in close fitting relation. Second inside diameter wall 50 is sized to receive therein collar portion 24 in close fitting relation. First inside diameter wall 48 is separated from second inside diameter wall 50 by annular wall face 52. Recess 46 is generally formed into back surface 54 of work piece 12.

Referring particularly to FIG. 3, conveyor member 14 generally includes hang hole tool receiver 56 coupled to suspension arm 58. Suspension arm 58 is suspended from conveyor track 60 as depicted in FIG. 1. Hang hole tool receiver 56 generally presents hollow cylindrical body 62 defining cavity 64. Cavity 64 is dimensioned to receive therein conveyor engaging portion 16. Hang hole tool receiver 56 may include set screws or other structures to fix conveyor engaging portion 16 removably within cavity 64. These structures are known to those of ordinary skill in the art and are not depicted here. Suspension arm 58 couples hollow cylindrical body 62 to conveyor track 60.

Figure 4:
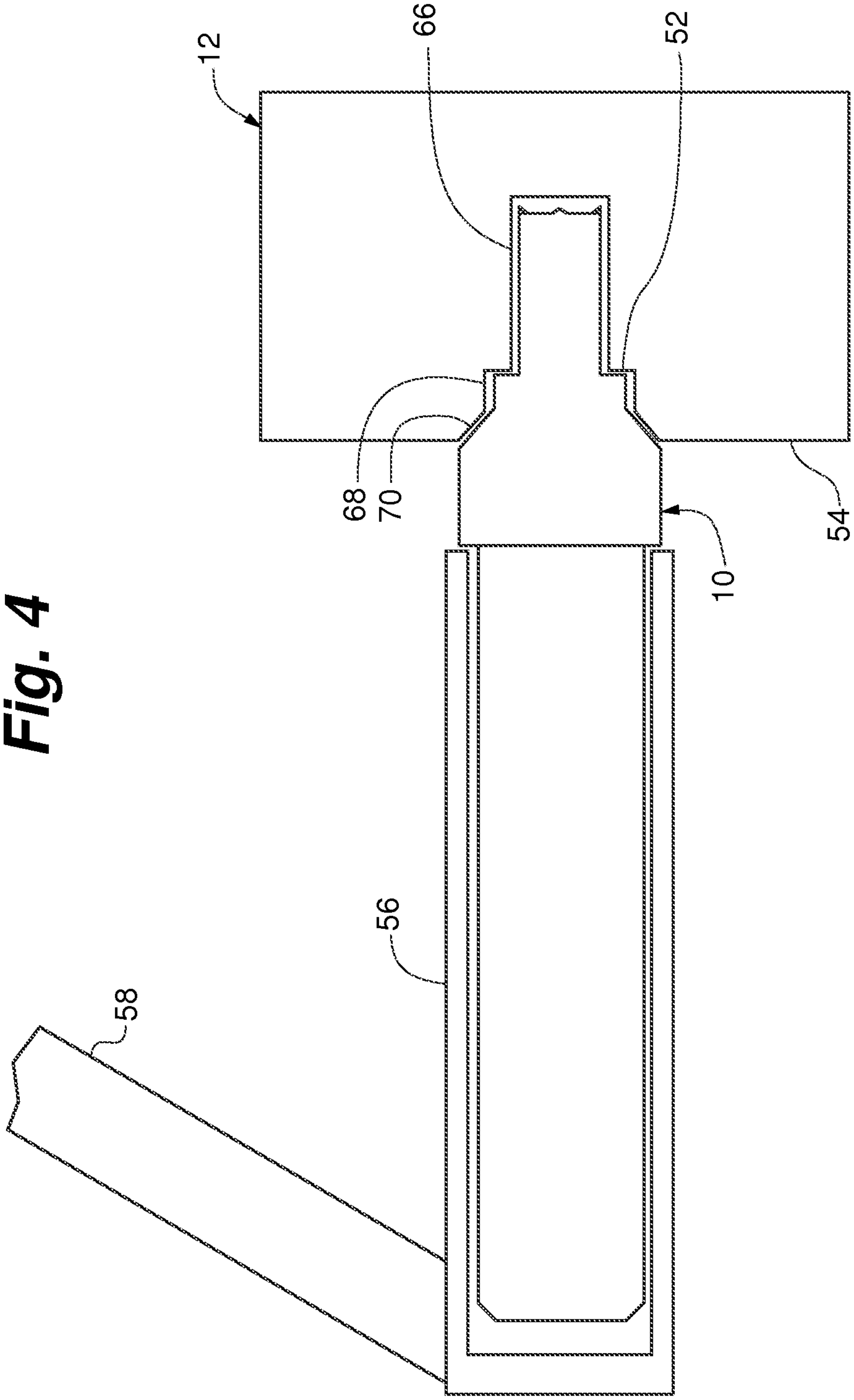
FIG. 4 is a sectional plan view of a hang hole tool engaged to a work piece and a conveyor member according to another example embodiment of the invention.

Referring to FIG. 4, according to another embodiment of the invention, work piece 12 defines recess 46 having first cylindrical cavity portion 66, second cylindrical cavity portion 68 and countersunk cavity portion 70. The dimensions of first cylindrical cavity portion 66, second cylindrical cavity portion 68 and countersunk cavity portion 70 are selected to receive work piece engaging portion 18 as depicted in FIG. 4.

Figure 5:
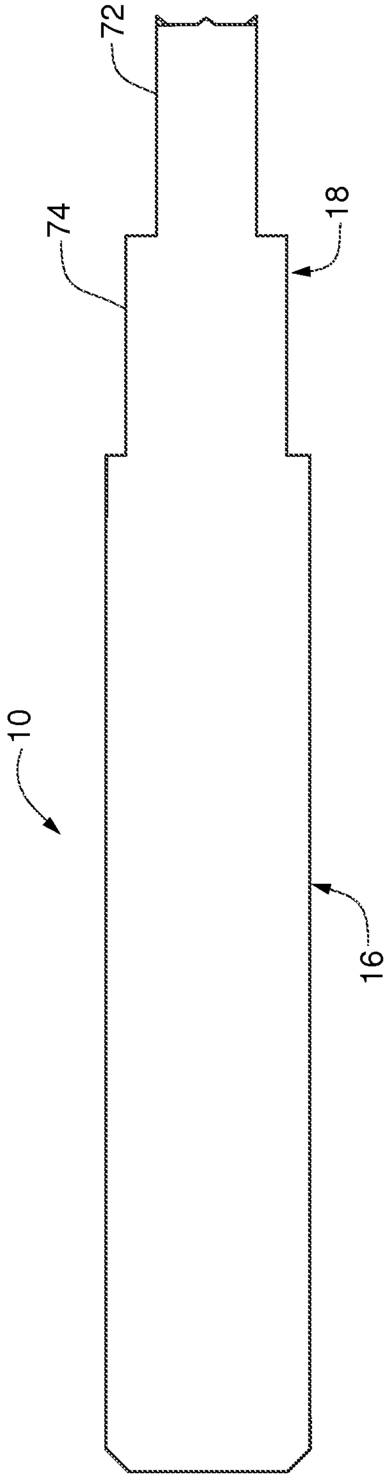
FIG. 5 is a sectional view of a hang hole tool according to another example embodiment of the invention.

Referring now to FIG. 5, according to another embodiment of the invention, work piece engaging portion 18 includes shaft portion 72 and collar portion 74.

Figure 7:
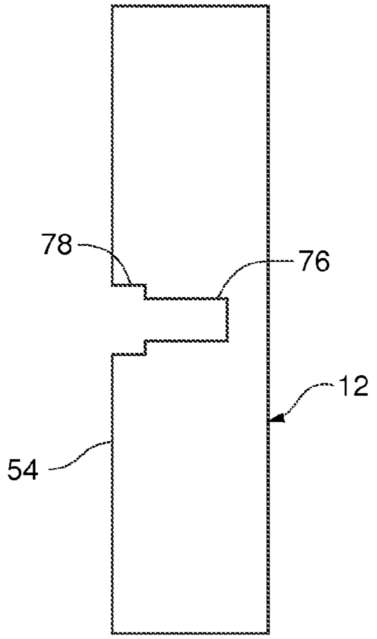
FIG. 7 is a sectional view of a work piece presenting a recess to receive the hang hold tool depicted in FIG. 5.

Referring to FIG. 7, when work piece engaging portion 18 as depicted in FIG. 5 is used, recess 46 of work piece 12 includes shaft receiving cavity portion 76 and cylindrical collar cavity portion 78 as depicted in FIG. 7.

Figure 6:
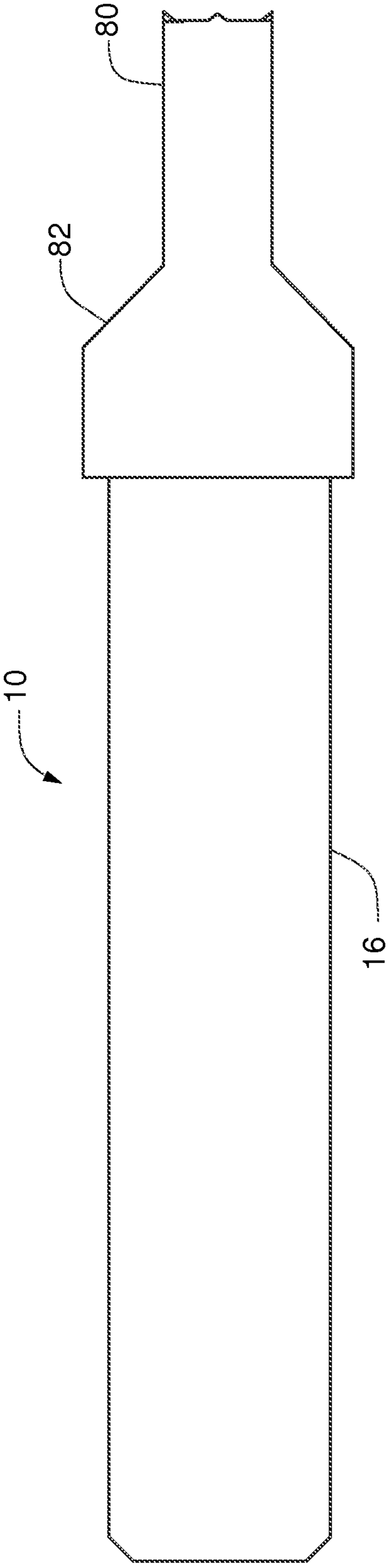
FIG. 6 is a sectional view of a hang hole tool according to another example embodiment of the invention.

Referring now to FIG. 6, according to another embodiment of the invention, work piece engaging portion 18 includes shaft portion 80 and frustoconical portion 82.

Figure 8:
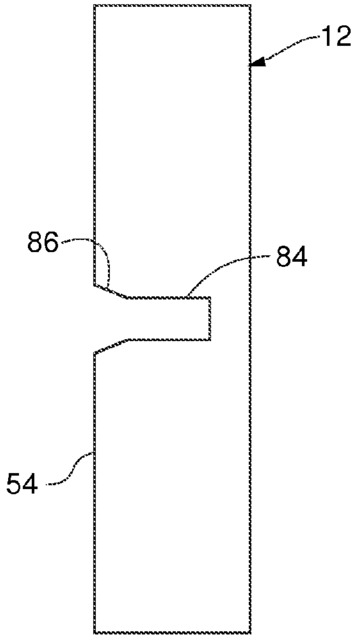
FIG. 8 is a sectional view of a work piece presenting a recess to receive the hang hold tool depicted in FIG. 6.

Referring to FIG. 8, complementary recess 46 of work piece 12 includes shaft receiving cavity portion 84 and countersunk cavity portion 86.

In all of the above-discussed embodiments, work piece engaging portion 18 is sized in dimension to be received into recess 46 of work piece 12 in a closely fitting manner.

In operation, hang hole tool 10 is coupled to conveyor member 14 by inserting conveyor engaging portion 16 into hang hole tool receiver 56. Thus, hang hole tool 10 is operably coupled via the hang hole tool receiver 56 and suspension arm 58 to conveyor track 60.

Work piece 12 is coupled to hang hole tool 10 at the beginning of a powder coating operation by placing recess 46 over work piece engaging portion 18.

In one example, as best seen in FIG. 3, cylindrical body 20 fits into first inside diameter wall 48, collar portion 24 is received into second inside diameter wall 50. Annular wall face 52 abuts annular face 38 of collar portion 24. At the same time, back surface 54 of work piece 12 abuts frustoconical face 42 of frustoconical portion 26. Contact between frustoconical portion 26 and back surface 54 is minimal due to the angle nature of frustoconical face 42. Thus, when work piece 12 has completed the powder coating process and is removed from hang hole tool 10, minimal amounts of cured powder coating that adhere to hang hole tool 10 are pulled free from work piece 12, thus minimizing unsightly disruption of the powder coating film.

Referring to FIGS. 5 and 7, shaft portion 72 is received in shaft receiving cavity portion 76 while collar portion 74 is received into shaft cylindrical collar cavity portion 78.

According, contact between work piece engaging portion 18 and recess 46 is minimized so that back surface 54 of work piece 12 has minimal separation of powder coated material when work piece 12 is removed from work piece engaging portion 18.

Similarly, referring to FIGS. 6 and 8, shaft portion 80 of work piece engaging portion 18 is received into shaft receiving cavity portion 84 of work piece 12 depicted in FIG. 8. Frustoconical portion 82 is received into countersunk cavity portion 86. Again, this structure of work piece engaging portion 18 and recess 46 demonstrates minimal contact between back surface 54 of work piece 12 and work piece engaging portion 18, thus when work piece 12 is removed from work piece engaging portion 18, minimal powder coating material comes off that may have adhered to work piece engaging portion 18.

Accordingly, the invention provides for better looking, more completely powder coated work piece 12 than do prior art hang hole tools.

The invention may be embodied in other specific forms without departing from the spirit of the essential attributes thereof, therefore, the illustrated embodiments should be considered in all respects as illustrative and not restrictive, reference being made to the appended claims rather than to the forgoing description to indicate the scope of the invention.

The invention claimed is:

1. A powder coating conveyor that supports parts during a powder coating process, comprising:

a conveyor structure that supports parts during the powder coating process including:

a hang hole tool having a conveyor engaging portion and a work piece engaging portion;

the conveyor engaging portion being structured to engage a conveyor member supported by the conveyor structure;

the work piece engaging portion presenting an outwardly extending shaft portion having a first diameter and an expanded portion having a second diameter;

the first diameter being smaller than the second diameter; and the outwardly extending shaft portion extending distally outward from the expanded portion;

wherein the expanded portion of the work piece engaging portion comprises a collar portion that is located adjacent to the shaft portion, the outwardly extending shaft portion extending distally outward from the collar portion.

2. A powder coating conveyor that supports parts during a powder coating process, comprising:

a conveyor structure that supports parts during the powder coating process including:

a hang hole tool having a conveyor engaging portion and a work piece engaging portion;

the conveyor engaging portion being structured to engage a conveyor member supported by the conveyor structure;

the work piece engaging portion presenting an outwardly extending shaft portion having a first diameter and an expanded portion having a second diameter;

the first diameter being smaller than the second diameter; and the outwardly extending shaft portion extending distally outward from the expanded portion;

wherein the expanded portion of the work piece engaging portion comprises a collar portion that is located adjacent to the shaft portion and a frustoconical portion, the outwardly extending shaft portion extending distally outward from the collar portion and the collar portion extending distally outward from the frustoconical portion.

3. A powder coating system comprising:

a powder coating conveyor;

a work piece;

the powder coating conveyor including a hang hole tool having a conveyor portion and a work piece engaging portion;

the work piece engaging portion being structured to engage a conveyor member supported by the conveyor structure;

the work piece engaging portion presenting an outwardly extending shaft portion having a first diameter extending distally outward from an expanded portion having a second diameter;

the first diameter being smaller than the second diameter;

wherein the expanded portion of the work piece engaging portion comprises a collar portion that is located adjacent to the shaft portion, the outwardly extending shaft portion extending distally outward from the collar portion; and the work piece presenting a recess therein, the recess being shaped and sized to receive the work piece engaging portion therein in close fitting relation the recess having a first inside dimension at a greatest depth of the recess and a second inside dimension at a least depth of the recess, the second inside dimension being greater than the first inside dimension.

4. The powder coating system as claimed in claim 3, wherein the expanded portion of the work piece engaging portion comprises a frustoconical portion, the outwardly extending shaft portion extending distally outward from the collar portion and the collar portion extending distally outward from the frustoconical portion.

5. The powder coating system as claimed in claim 3, wherein the expanded portion of the work piece engaging portion comprises a frustoconical portion, the outwardly extending shaft portion extending distally outward from the frustoconical portion.

6. The powder coating system as claimed in claim 3, wherein the work piece recess presents a first cylindrical cavity portion dimensioned to receive the outwardly extending shaft portion in close fitting relation therein.

7. The powder coating system as claimed in claim 3, wherein the work piece recess presents a second cylindrical cavity portion dimensioned to receive the collar in close fitting relation therein.

8. The powder coating system as claimed in claim 4, wherein the work piece recess presents a countersunk cavity portion dimensioned to receive the frustoconical portion in close fitting relation therein.

9. The powder coating system as claimed in claim 4, wherein the work piece recess presents a second cylindrical cavity portion dimensioned to receive the collar in close fitting relation therein.

10. The powder coating system as claimed in claim 4, wherein the work piece recess presents a countersunk cavity portion dimensioned to receive the frustoconical portion in close fitting relation therein.

11. The powder coating system as claimed in claim 5, wherein the work piece recess presents a countersunk cavity portion dimensioned to receive the frustoconical portion in close fitting relation therein.

* * * * *